United States Patent
French et al.

(10) Patent No.: US 11,978,412 B2
(45) Date of Patent: May 7, 2024

(54) DISPLAY DEVICE AND IMAGE PROCESSING METHOD

(71) Applicant: E Ink Holdings Inc., Hsinchu (TW)

(72) Inventors: Ian French, Hsinchu (TW); Xian-Teng Chung, Hsinchu (TW); Jau-Min Ding, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 17/577,389

(22) Filed: Jan. 18, 2022

(65) Prior Publication Data

US 2022/0277697 A1    Sep. 1, 2022

Related U.S. Application Data

(60) Provisional application No. 63/153,963, filed on Feb. 26, 2021.

(51) Int. Cl.
*G09G 3/34* (2006.01)
*G02F 1/1677* (2019.01)

(52) U.S. Cl.
CPC ........... *G09G 3/344* (2013.01); *G02F 1/1677* (2019.01); *G09G 2320/0646* (2013.01); *G09G 2320/066* (2013.01); *G09G 2320/0666* (2013.01)

(58) Field of Classification Search
CPC ......... G09G 3/3618; G09G 2340/0492; G09G 5/393; G09G 5/395; G06F 1/163; G06T 3/606
See application file for complete search history.

(56) References Cited

U.S. PATENT DOCUMENTS

| | | | |
|---|---|---|---|
| 6,075,905 A | 6/2000 | Herman et al. | |
| 6,928,196 B1 | 8/2005 | Bradley et al. | |
| 7,426,312 B2 | 9/2008 | Dance et al. | |
| 8,457,433 B2 | 6/2013 | Hong | |
| 9,229,526 B1* | 1/2016 | Neglur | G06F 3/0304 |
| 2011/0142363 A1* | 6/2011 | Nojima | G06T 5/20 |
| | | | 382/254 |
| 2014/0212064 A1* | 7/2014 | Heo | G06T 7/13 |
| | | | 382/275 |
| 2018/0338138 A1* | 11/2018 | Zeng | G09G 3/32 |
| 2019/0206058 A1 | 7/2019 | Okada | |

FOREIGN PATENT DOCUMENTS

| | | |
|---|---|---|
| CN | 101076078 A | 11/2007 |
| CN | 101197911 A | 6/2008 |
| CN | 102984434 A | 3/2013 |

(Continued)

OTHER PUBLICATIONS

The office action of corresponding TW application No. 111101917 dated Dec. 29, 2022.

(Continued)

*Primary Examiner* — Priyank J Shah
(74) *Attorney, Agent, or Firm* — CKC & Partners Co., LLC

(57) ABSTRACT

An image processing method, including the following steps: receiving an original image signal, wherein the original image signal includes a plurality of original pixel values; identifying an edge of at least one object in the original image signal to generate a contour image signal; and correcting the original image signal according to the contour image signal to generate an enhanced image signal.

14 Claims, 6 Drawing Sheets

(56) References Cited

FOREIGN PATENT DOCUMENTS

| | | |
|---|---|---|
| CN | 103839509 A | 6/2014 |
| CN | 102984434 B | 3/2015 |
| CN | 106469533 A | 3/2017 |
| CN | 109509161 A | 3/2019 |
| CN | 109814292 A | 5/2019 |
| CN | 111492402 A | 8/2020 |
| KR | 20160046983 A | 5/2016 |
| TW | 201603556 A | 1/2016 |

OTHER PUBLICATIONS

The office action of corresponding CN application No. 202210054676.3 issued on Mar. 5, 2024.

* cited by examiner

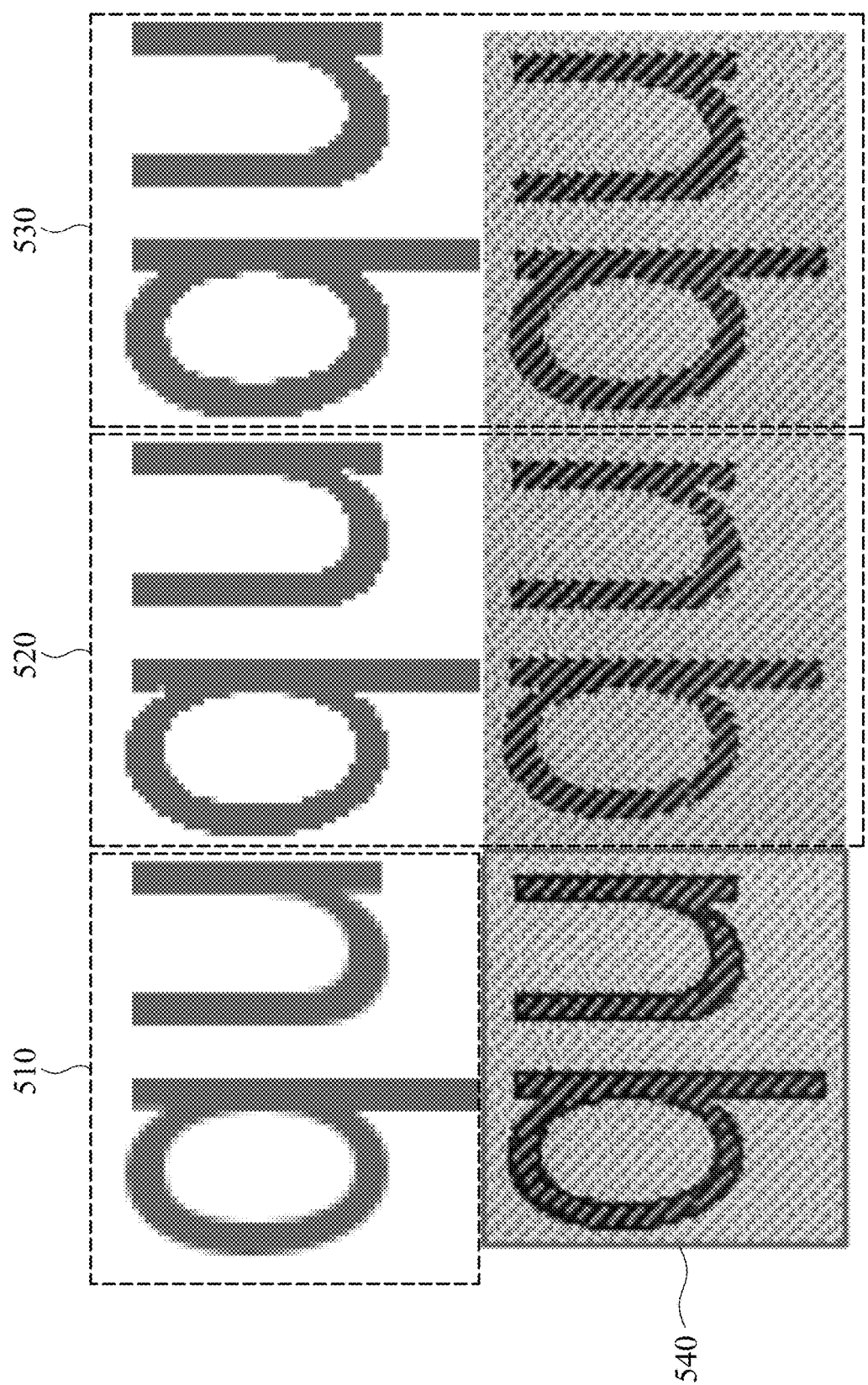

DISPLAY DEVICE AND IMAGE PROCESSING METHOD

CROSS-REFERENCE TO RELATED APPLICATION

This application claims priority to U.S. Provisional Application Ser. No. 63/153,963, filed Feb. 26, 2021, which is herein incorporated by reference in its entirety.

BACKGROUND

Technical Field

The present disclosure relates to a display device and an image processing method, especially a technology for presenting images based on image signals.

Description of Related Art

Currently, among various consumer electronic products, "reflective display devices" are widely used to make display panels, such as electronic paper display devices. The reflective display device uses light to illuminate the display material layer to display images and reduce power consumption. However, with the improvement of imaging technology, the resolution of the image is getting higher and higher. Under the condition that the resolution of the image increases, how to improve the image processing method so that the screen will not appear jagged or broken when the reflective display device displays high-resolution images, which has become a major research topic at present.

SUMMARY

One aspect of the present disclosure is an image processing method, comprising: receiving an original image signal, wherein the original image signal comprises a plurality of original pixel values; identifying an edge of at least one object in the original image signal to generate a contour image signal; and correcting the original image signal according to the contour image signal to generate an enhanced image signal.

Another aspect of the present disclosure is a display device, comprising a display circuit and a processor. The display circuit comprises a plurality of pixel units. The processor is electrically connected to the display circuit, and is configured to receive an original image signal. The processor is configured to identify an edge of an object in the original image signal to generate an contour image signal, and the processor is further configured to correct the original image signal according to the contour image signal to generate an enhanced image signal.

Another aspect of the present disclosure is an image processing method, comprising: receiving an original image signal, wherein the original image signal comprises a plurality of original pixel values; identifying an edge of at least one object in the original image signal to generate a contour image signal; and enhancing the edge of the at least one object in the original image signal by using the contour image signal to generate an enhanced image signal.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows:

FIG. 5 is a schematic diagram of the comparison between the image processing method in some embodiments of the present disclosure and other methods.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1A:
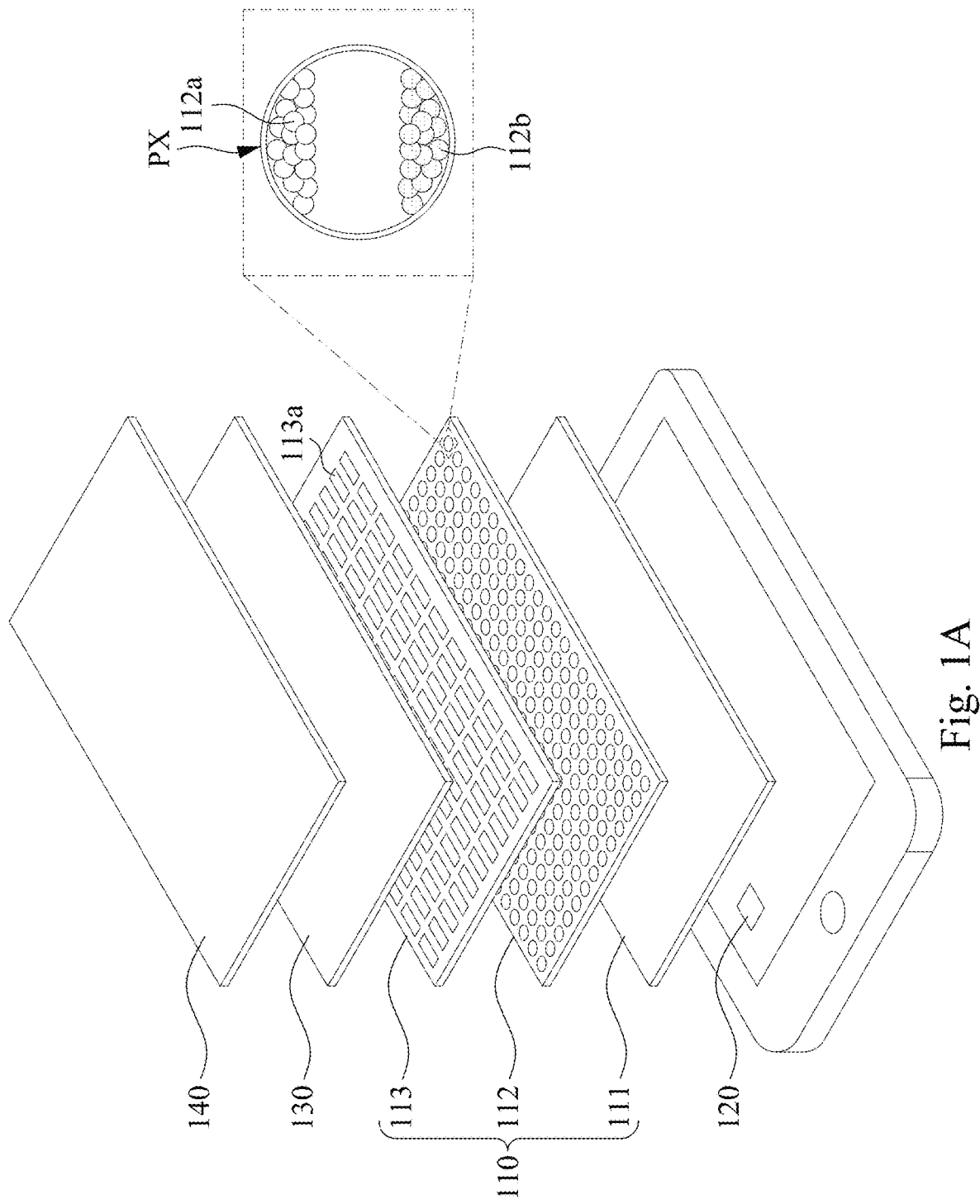
FIG. 1A is a schematic diagram of a display device in some embodiments of the present disclosure.

The present disclosure relates to a display device and an image processing method. FIG. 1A is a schematic diagram of a display device 100 in some embodiments of the present disclosure. The display device 100 at least includes a display circuit 110 and a processor 120. In one embodiment, the display device 100 is implemented to a reflective display device, such as an electronic paper, but the present disclosure is not limited to electronic paper. In other embodiments, the image processing method is applied to other types of display device.

As shown in FIG. 1A, the display circuit 110 further includes a transistor array layer 111, an electronic ink layer 112 and a color filter layer 113. The transistor array layer 111 (e.g., TFT array) can form an electric field according to the control voltage, so as to adjust positions of multiple electrophoretic particles 112a, 112b in the electronic ink layer 112, and display different grayscale colors. The electrophoretic particles 112a, 112b are respectively encapsulated in multiple Microcapsules or Microcups, as multiple pixel units PX, but the electronic ink layer 112 of the present disclosure is not limited to the above structure.

As mentioned above, the color filter layer 113 (e.g., color filter array) includes multiple filter units 113a, such as red, green and blue filter units. The position of each of the filter units 113a corresponds to one or more pixel units PX. The filter units 113a are arranged in a specific way, so that the grayscale image displayed by the electronic ink layer 112 can form a color image through the color filter layer 113.

In some other embodiments, the display device 100 further includes a touch panel 130 and a front light module 140, the touch panel 130 is configured to a touch action of user, and the front light module 140 is configured to provide a front light source.

The processor 120 is electrically connected the display circuit 110, and is integrated with the display circuit 110. The processor 120 is configured to receive an original image signal (e.g., a photo of a chameleon, or an image of an article). The processor 120 generates a control voltage according to the original image signal to generate an electric field through the transistor array layer 111, adjust the positions of the electrophoretic particles 112a, 112b, and then make the display circuit 110 display the corresponding screen. However, when the original image signal is configured to present tiny objects (e.g., small fonts or small objects), there may be problems with insufficient clarity. Therefore, the present disclosure corrects the original image signal to improve the image quality.

In some embodiments, when the processor 120 receives the original image signal, the processor 120 will identify the pixel value that is configured to present edge of one or more objects in the original image signal to generate a contour image signal. By capturing the contour image signal and correcting the original image signal accordingly, the display device 100 will be able to strengthen the edge of the object in the screen, making the screen clearer. In other words, the processor 120 can use the contour image signal to enhance the edges of objects in the original image signal to generate the enhanced image signal.

Figure 1B:
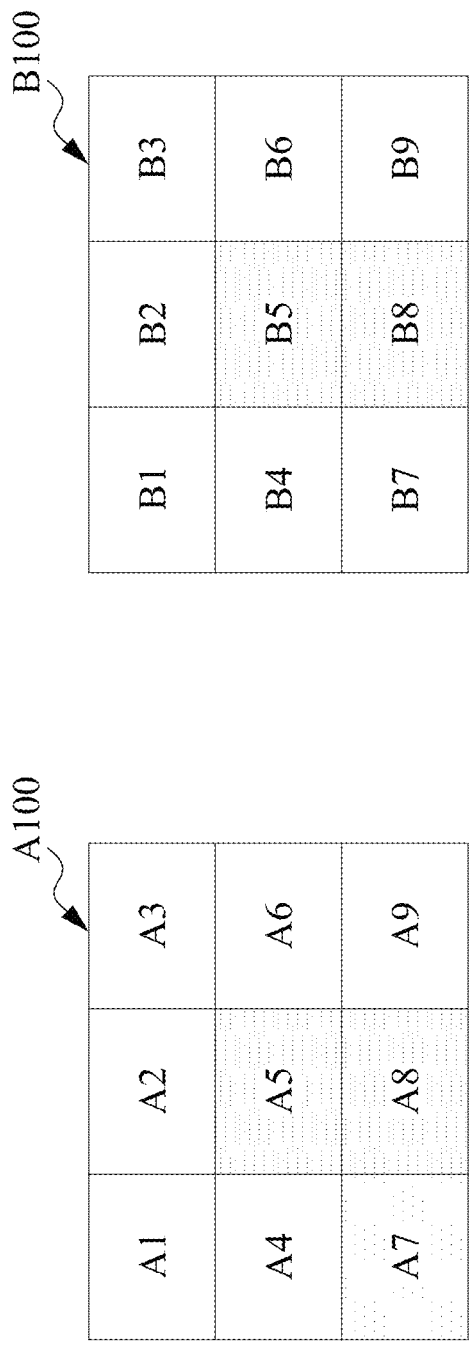
FIG. 1B is a schematic diagram of an original image screen and a contour image screen in some embodiments of the present disclosure.
Figure 2:
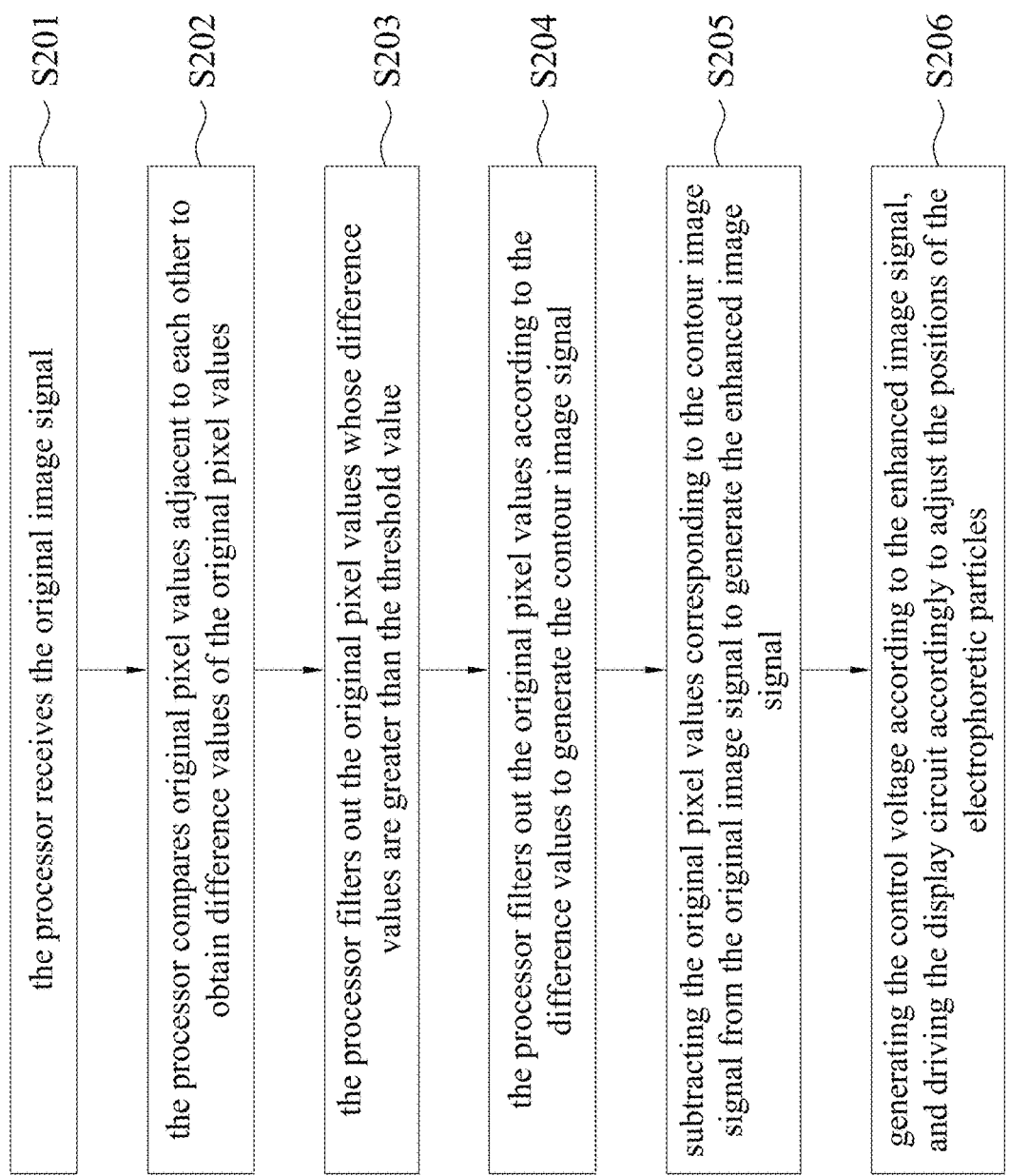
FIG. 2 is a flowchart illustrating an image processing method in some embodiments of the present disclosure.

FIG. 1B is a schematic diagram of an original image screen A100 and a contour image screen B100 in some embodiments of the present disclosure. FIG. 2 is a flowchart illustrating an image processing method in some embodiments of the present disclosure. In step S201, the processor 120 receives the original image signal, wherein the original image signal further includes multiple original pixel values. As shown in FIG. 1B, the original picture A is composed of multiple pixels A1-A9, and the original pixel values can be the grayscale value or brightness value of each pixel.

In step S202, the processor 120 compares original pixel values adjacent to each other to obtain difference values of the original pixel values. For example, for pixel A5, the processor 120 can compare the differences between pixel A5 and pixel A1-A4 and A6-A9, respectively, and average the comparison results, or take the maximum value as "the difference values of pixel A5".

In step S203, the processor 120 filters out the original pixel values whose difference values are greater than the threshold value. Specifically, the processor 120 determines whether the difference values are greater than a threshold value (e.g., the difference is greater than 60%). The original pixel values, whose corresponding difference values are greater than the threshold value, will be set as the contour pixel values.

In step S204, the processor 120 retains the original pixel values of the original image signal whose difference values are greater than the threshold value (i.e., the above contour pixel values), and deletes/subtracts other unfiltered the original pixel values to form the contour image signal. In other words, the processor 120 filters out the original pixel values according to the difference values to generate the contour image signal. The contour image signal includes the contour pixel values.

The contour image B100 corresponding to the contour image signal is shown in FIG. 1B. If the difference between the original pixels A5, A8 and other surrounding pixels is greater than the threshold value, it means that the original pixels A5, A8 are configured to present the outline or edge of an object. Therefore, the processor will only retain the original pixels A5, A8, and delete/subtract other original pixels. Similarly, if the difference between the original pixel A7 and other surrounding pixels is less than the threshold value, it means that the original pixel A7 is not used to present the outline or edge of an object and will be deleted. The filtered result (i.e., the retained original pixel values, or contour image B100 shown in FIG. 1B) is used as the contour image signal. There are many algorithms for extracting the contours of objects from images. Since people having ordinary skill in the art can understand the principles, it will not repeat them here.

In step S205, after obtaining the contour image signal, the processor 120 reduces the original pixel values corresponding to the contour image signal in the original image signal according to the contour image signal. The "contour" is usually recorded in light-colored or white pixels in image processing. The processor 120 can subtract the original pixel values corresponding to the contour image signal from the original image signal to generate the enhanced image signal (in FIG. 1B, the original pixels A5 and A8 corresponding to the contour pixels B5 and B8 are subtracted, so that the positions of the original pixels A5 and A8 are highlighted in dark colors). In some embodiments, the processor can reduce the original pixel values corresponding to the contour image signal in the original image signal according to a preset correction ratio. For example, the original pixel A5, A8 corresponding to the contour pixels B5, B8 will be reduced by 60% of its grayscale value or brightness value. The correction ratio can be adjusted according to display requirements. In addition, in some other embodiments, the processor 120 may also set different correction ratios for different parts (i.e., different areas of the original image screen) of the original image signal.

In step S206, when the processor 120 obtains the enhanced image signal, the processor 120 generates the control voltage according to the enhanced image signal, and drives the display circuit 110 accordingly to adjust the positions of the electrophoretic particles 112a, 112b to present an enhanced image.

In some embodiments, before the processor 120 corrects the original image signal according to the contour image signal, the processor 120 can perform a color enhancement process on the original image signal first. During the color enhancement process, the processor 120 adjusts the saturation, contrast or brightness of the original signal. The color enhancement process can improve the color quality of the picture, but it may also affect the clarity of the picture. The present disclosure first performs the color enhancement for the original image signal, and then corrects the original image signal according to the contour image signal after the color enhancement. Accordingly, both color quality and image clarity can be ensured.

Figure 3A:
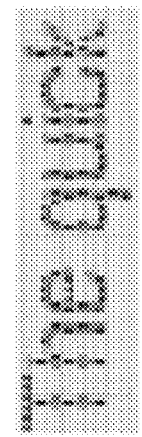
FIG. 3A-3C are schematic diagrams of the original image screen and the contour image screen and the enhanced image screen in some embodiments of the present disclosure.
Figure 3B:
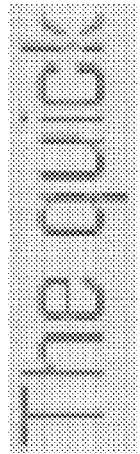
Figure 3C:
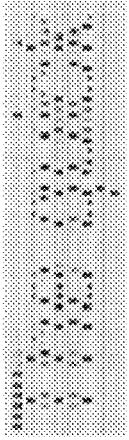

FIG. 3A-3C are schematic diagrams after processing the "text screen". FIG. 3A is a schematic diagram of the original image screen in some embodiments of the present disclosure. FIG. 3B is a schematic diagram of the contour image screen in some embodiments of the present disclosure. FIG.

3C is a schematic diagram of the result of correcting the original image screen according to the contour image signal (i.e., the enhanced image screen) in some embodiments of the present disclosure. It can be clearly seen from the diagrams that the corrected screen is significantly sharper and clearer. It's worth noting that the contour image screen shown in FIG. 3B has been converted from an inverted color to a black outline. In other words, according to the contour image signal generated by different acquisition methods, the "contour" may be presented in dark or light colors.

Figure 4A:
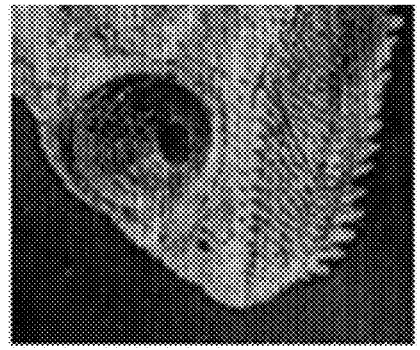
FIG. 4A-4C are schematic diagrams of the original image screen and the contour image screen and the enhanced image screen in some embodiments of the present disclosure.
Figure 4B:
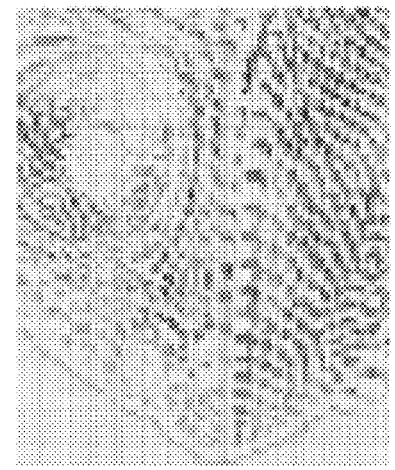
Figure 4C:
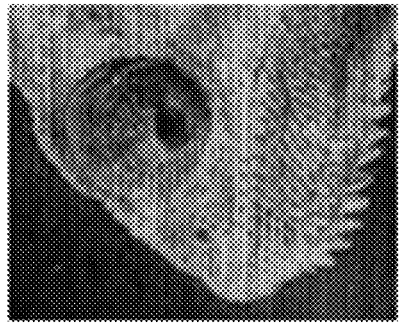

Similarly, FIG. 4A-4C are schematic diagrams of "photo of chameleon" after processing. FIG. 4A is a schematic diagram of the original image screen in some embodiments of the present disclosure. FIG. 4B is a schematic diagram of the contour image screen in some embodiments of the present disclosure. FIG. 4C is a schematic diagram of the result of correcting the original image screen according to the contour image signal (i.e., the enhanced image screen) in some embodiments of the present disclosure. It can be clearly seen from the diagrams that the corrected screen is significantly sharper and clearer.

FIG. 5 is a schematic diagram of the comparison between the image processing method in some embodiments of the present disclosure and other methods. The image 510 is the original image screen. The images 520 and 530 are the images presented by different edge enhancement algorithms. The image 540 is the enhanced image screen using the image processing method of some embodiments of the present disclosure. Comparing the diagrams, it can be seen that the edges of the image 540 is clearer than that of the other images 510-530, and there is no jaggedness.

Figure 6:
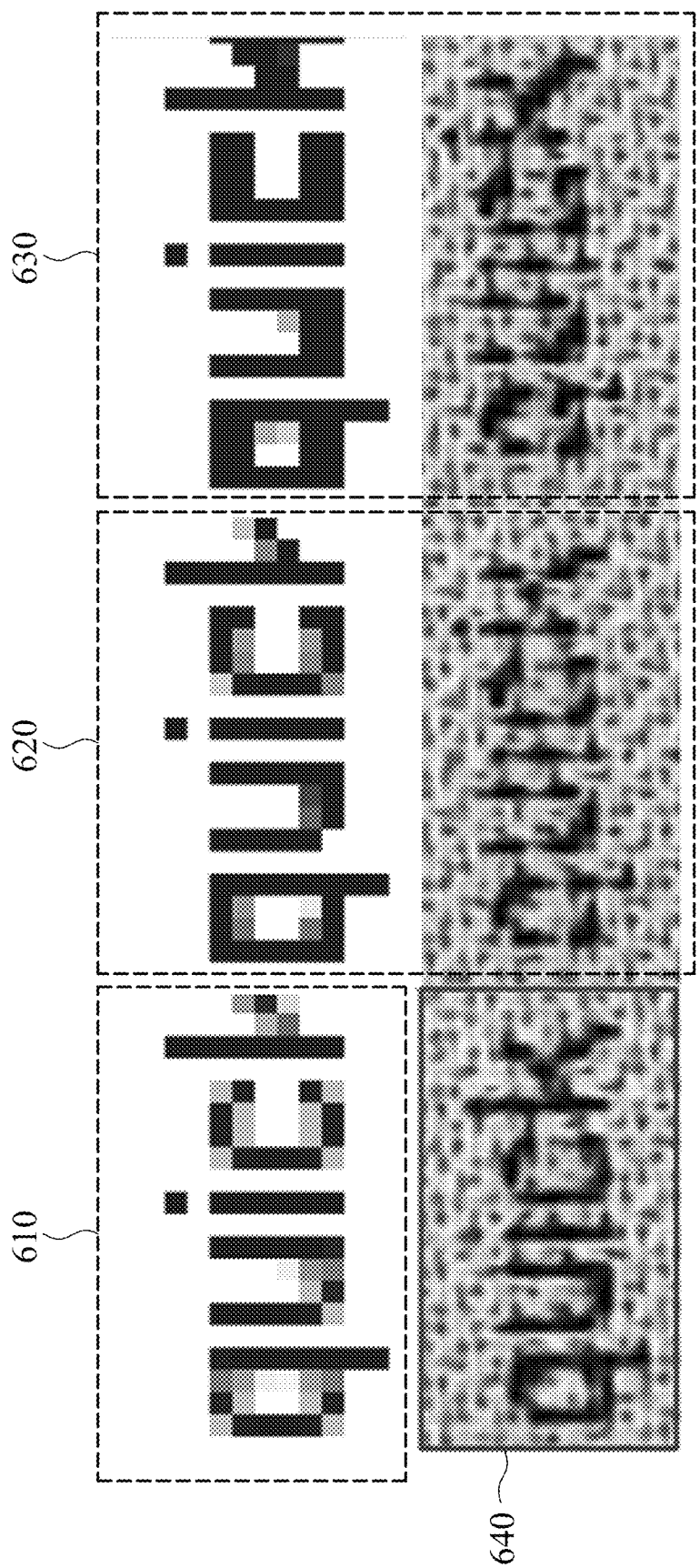
FIG. 6 is a schematic diagram of the comparison between the image processing method in some embodiments of the present disclosure and other methods.

Similarly, FIG. 6 is a schematic diagram of the comparison between the image processing method in some embodiments of the present disclosure and other methods. The image 610 is the original image screen. The images 620 and 630 are the images presented by different edge enhancement algorithms. The image 640 is the enhanced image screen using the image processing method of some embodiments of the present disclosure. Comparing the diagrams, it can be seen that the edges of the image 640 is clearer than the other images 610-630, and the "q" in the screen is the most complete, and there is no distortion of the contour fracture.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. An image processing method, comprising:
   receiving an original image signal, wherein the original image signal comprises a plurality of original pixel values, wherein the original pixel values are a plurality of original brightness values;
   identifying an edge of at least one object in the original image signal to generate a contour image signal; and
   performing a color enhancement process on the original image signal;
   correcting the original image signal that has been performed by the color enhancement process by adjusting the plurality of original brightness values according to the contour image signal to generate an enhanced image signal,
   wherein the plurality of original brightness values corresponding to the contour image signal are subtracted from the original image signal to generate the enhanced image signal, wherein the enhanced image signal highlights pixels of the edge of the at least one object in dark colors.

2. The image processing method of claim 1, wherein generate the contour image signal comprises:
   comparing the plurality of original pixel values adjacent to each other to obtain a plurality of difference values; and
   generating the contour image signal according to the plurality of difference values, wherein the contour image signal comprises a plurality of contour pixel values.

3. The image processing method of claim 2, wherein generate the contour image signal further comprises:
   retaining the plurality of original pixel values of the original image signal whose difference values are greater than a threshold value, and using the retained original pixel values as the contour pixel values.

4. The image processing method of claim 2, wherein generate the enhanced image signal comprises:
   reducing the plurality of original brightness values corresponding to the contour image signal in the original image signal according to a correction ratio.

5. The image processing method of claim 1, wherein performing the color enhancement process comprises:
   adjusting a saturation, a contrast or a brightness of the original image signal.

6. The image processing method of claim 1, further comprising:
   generating a control voltage according to the enhanced image signal to adjust a plurality of positions of a plurality of electrophoretic particles.

7. A display device, comprising:
   a display circuit comprising a plurality of pixel units; and
   a processor electrically connected to the display circuit, and configured to receive an original image signal, wherein the original image signal comprises a plurality of original pixel values, wherein the original pixel values are a plurality of original brightness values;
   wherein the processor is configured to identify an edge of an object in the original image signal to generate an contour image signal, and is configured to perform a color enhancement process on the original image signal;
   wherein the processor is further configured to correct the original brightness values of the original image signal that has been performed by the color enhancement process according to the contour image signal to generate an enhanced image signal,
   wherein the plurality of original brightness values corresponding to the contour image signal are subtracted from the original image signal to generate the enhanced image signal, wherein the enhanced image signal highlights pixels of the edge of the object in dark colors.

8. The display device of claim 7, wherein the processor is configured to compare a plurality of original pixel values of the original image signal to obtain a plurality of difference values, and the processor is further configured to generate the contour image signal according to the plurality of difference values, and the contour image signal comprises a plurality of contour pixel values.

9. The display device of claim 8, wherein the processor is configured to retain the plurality of original pixel values of the original image signal whose difference values are greater than a threshold value, and is configured to use the retained original pixel values as the contour pixel values.

10. The display device of claim 8, wherein the processor is configured to reduce the plurality of original brightness values corresponding to the contour image signal in the original image signal according to a correction ratio.

11. The display device of claim 7, wherein the processor is configured to adjust a saturation, a contrast or a brightness of the original image signal during the color enhancement process.

12. The display device of claim 7, wherein the plurality of pixel units comprises a plurality of electrophoretic particles, and the processor is configured to generate a control voltage according to the enhanced image signal to adjust a plurality of positions of the plurality of electrophoretic particles.

13. The display device of claim 12, further comprising:
a color filter layer comprising a plurality of filter units, and the plurality of filter units correspond to the plurality of pixel units.

14. An image processing method, comprising:
receiving an original image signal, wherein the original image signal comprises a plurality of original pixel values, wherein the original pixel values are a plurality of original brightness values;
identifying an edge of at least one object in the original image signal to generate a contour image signal;
performing a color enhancement process on the original image signal; and
enhancing the edge of the at least one object in the original image signal that has been performed by the color enhancement process by adjusting the plurality of original brightness values according to the contour image signal to generate an enhanced image signal,
wherein the plurality of original brightness values corresponding to the contour image signal are subtracted from the original image signal to generate the enhanced image signal, wherein the enhanced image signal highlights pixels of the edge of the at least one object in dark colors.

* * * * *